Patented July 20, 1926.  1,593,446

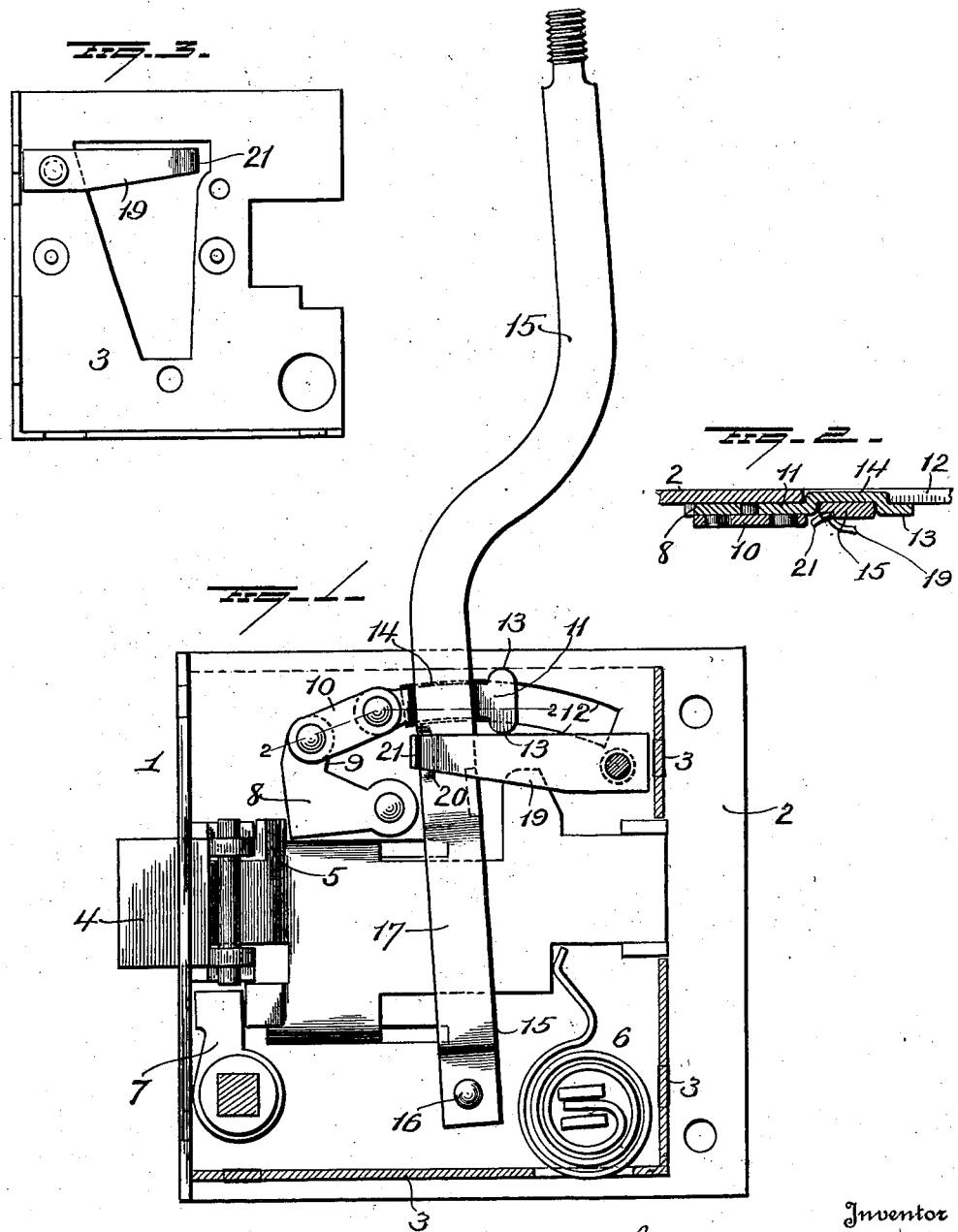

UNITED STATES PATENT OFFICE.

JOHN B. FREYSINGER, OF NEW BRITAIN, CONNECTICUT, ASSIGNOR TO NORTH & JUDD MANUFACTURING COMPANY, OF NEW BRITAIN, CONNECTICUT.

LATCH.

Application filed July 12, 1924. Serial No. 725,641.

This invention relates to latches and is intended more particularly for application to the doors of motor vehicles although it is not confined to such use.

The object of the invention is to provide simple and efficient means within the case whereby the latch bolt may be secured in its projected position and positively held against retraction. This object is attained in such a mechanism as is illustrated in the accompanying drawing and hereinafter described, and the invention resides in certain novel features which will be particularly pointed out in the claims.

In the accompanying drawings,—

Figure 1 is an elevation of the latch with the cover removed, the parts being in the locked position.

Figure 2 is a horizontal section, the cover being in place, and

Figure 3 is a detail elevation of a part of the cover.

The latch proper shown in the drawing is of that type in which a bolt 1 is slidably mounted in a case which includes a main frame member 2 and a cover 3. The bolt is operatively connected with a latch head 4 and is provided on its upper edge with a lug or stop shoulder 5, being normally projected by a spring 6 and adapted to be retracted by an arm 7 on the usual knob spindle.

In carrying out my present invention, a dog 8 is pivoted within the case above the bolt and extends forwardly from its pivot in position to engage behind the stop 5. The dog is formed with an extension or upwardly projecting ear 9 at its front end to which is pivotally attached the front of a link 10 which has its rear end pivoted to the front end of a yoke 11 which is slidably mounted in an arcuate slot 12 formed in the frame member 2 of the lock case. The yoke has expanded ends, as indicated at 13, and its intermediate portion is offset, as indicated at 14, to fit within the slot 12 and also provide a seat for the operating lever 15, the expanded ends bridging the slot and bearing against the inner side of the case frame so as to guide the yoke in its movement. The operating lever extends across the bolt 1 and is fulcrumed below the same, at 16, concentric with the slot 12, being extended through the top of the lock case and above the door and equipped with any approved form of handle or grip member in the usual manner. The lever is offset, as at 17, to clear the bolt and, immediately above the offset, it may at its rear edge bear against the lug 18 on the bolt so that the lever, as well as the knob spindle may be employed to retract the bolt and unlatch the door. In rear of the lever, a leaf spring detent 19 is secured to the cover 3 of the lock case and extends forwardly beside the lever to engage a seating groove or recess 20 in the side of the latter to hold in the locked position, the free end of the spring being laterally deflected to form a tooth or spur 21 which will readily ride into and out of the seat 20.

From the foregoing description, taken in connection with the accompanying drawing, the operation and advantages of the device will be readily understood. When the door, in which the latch is fitted, is closed, the latch automatically engages the keeper under the influence of the spring. The lever 15 is then swung forward, transmitting its movement directly to the yoke and thence through the link 10 to the dog 8 which is rocked into position behind the stop 5 and into engagement therewith, the spur 21 on the detent 19 riding into engagement with the seat 20 to hold the lever against accidental reverse movement. The bolt will thus be effectually held in its projected position and the door will remain locked notwithstanding the jolts and vibrations to which it may be subjected when traveling over rough roads. When the dog 8 is engaged with the bolt, the lever will incline forwardly and will be spaced from the lug 18. If the lever be swung rearwardly to a vertical position, the dog will be raised out of the path of the stop 5 but the bolt will remain projected and may be retracted by rocking the knob spindle. If it be desired to quickly open the door, the lever is swung rearwardly to the limit of its movement, first releasing the dog and then engaging the lug 18 and retracting the bolt.

My device is simple, compact, and efficient, and may be easily embodied in locks now in use at little expense.

Having fully described my invention what I claim as new and desire to secure by Letters-Patent, is:—

1. The combination with a sliding bolt, of a dog pivoted adjacent to the bolt, a lever fulcrumed adjacent the bolt, a slidable yoke directly engaged by the lever, and a link connecting the yoke with the dog whereby the dog may be engaged with or released from the bolt.

2. The combination with a sliding bolt having a stop on its upper edge, a dog pivoted adjacent to the bolt and adapted to engage behind said stop, a lever operatively connected with the dog, and a detent to engage the lever when the dog engages the stop on the bolt.

3. The combination with a sliding bolt, of a dog pivotally mounted adjacent to the bolt to engage the latter in its projected position, a lever pivoted adjacent the bolt and operatively connected with the dog and provided with a seat in its side, and a detent arranged beside the lever to engage said seat and prevent release of the dog.

4. The combination of a sliding bolt, a dog pivotally mounted adjacent to the bolt to engage the latter in its projected position, a lever operatively connected with the dog and having a recess in its side, and a detent spring secured at one end and extending beside the lever and provided at its free end with a spur to engage in the recess in the side of the lever.

5. The combination of a case having an arcuate slot in one side, a sliding bolt in the case below the slot, an upstanding lug on the bolt, a dog pivotally mounted adjacent to the bolt and adapted to engage the same to hold it projected, a yoke slidably fitted in the slot in the case, a link connecting the yoke with the dog, and a lever fulcrumed concentric with the arcuate slot and extending across and seating in the yoke, said lever being adapted to engage the upstanding lug on the bolt whereby to retract the bolt.

In testimony whereof, I have signed this specification.

JOHN B. FREYSINGER.